United States Patent [19]

Broadbent

[11] Patent Number: 4,671,562
[45] Date of Patent: Jun. 9, 1987

[54] VAN BODIES

[76] Inventor: Edward G. Broadbent, 91 Park La., Sandbach, Cheshire, CW11 9EE, England

[21] Appl. No.: 695,905

[22] Filed: Jan. 29, 1985

[30] Foreign Application Priority Data

Feb. 3, 1984 [GB] United Kingdom ................ 8402927

[51] Int. Cl.$^4$ ................................................ B60J 5/06
[52] U.S. Cl. .................................... 296/181; 296/183
[58] Field of Search ............... 296/181, 182, 183, 187, 296/191, 193, 199, 197, 138, 143, 15, 29, 30, 204, 209; 105/409, 418, 422, 355, 404, 380

[56] References Cited

U.S. PATENT DOCUMENTS

| | | | |
|---|---|---|---|
| 2,114,754 | 4/1938 | Wasberg | 105/404 X |
| 2,585,976 | 2/1952 | Teeter | 296/29 X |
| 2,814,997 | 12/1957 | Deam | 105/418 |
| 2,991,116 | 7/1961 | Andrews | 296/181 |
| 3,035,531 | 5/1962 | Leriche | 105/418 X |
| 3,185,112 | 5/1965 | Johnston | 105/422 X |
| 3,252,730 | 5/1966 | Chieger et al. | 296/181 |
| 3,266,837 | 8/1966 | Stricker, Jr. et al. | 296/181 |
| 3,393,920 | 7/1968 | Ehrlich | 296/181 |
| 3,641,943 | 2/1972 | O'Neill | 105/418 |
| 4,408,793 | 10/1983 | Broadbent | 296/181 |
| 4,453,875 | 6/1984 | Johnson, Sr. | 105/355 X |
| 4,545,611 | 10/1985 | Broadbent | 296/183 X |

FOREIGN PATENT DOCUMENTS

| | | | |
|---|---|---|---|
| 1542811 | 3/1979 | United Kingdom | 296/183 |
| 2124159 | 2/1984 | United Kingdom | 296/181 |

Primary Examiner—Robert B. Reeves
Assistant Examiner—Russell D. Stormer
Attorney, Agent, or Firm—Woodward, Weikart, Emhardt & Naughton

[57] ABSTRACT

A curtainsided van body has at least one open vertical side closable by a curtain incorporating straps or similar for constraining the curtain in a vertical plane. The straps or similar have at or adjacent their lower ends rave-engaging hooks. The van body has a floor for supporting cargo and a rave along said at least one open vertical side and engagable by said hooks to constrain the curtain vertically. The rave is height adjustable relative to the floor to provide a sill level with the floor to accommodate cargo extending to the floor edge, or above the floor to provide a bottom restraint for cargo. The rave may be unitary or comprise relatively adjustable inner and outer rave members.

9 Claims, 9 Drawing Figures

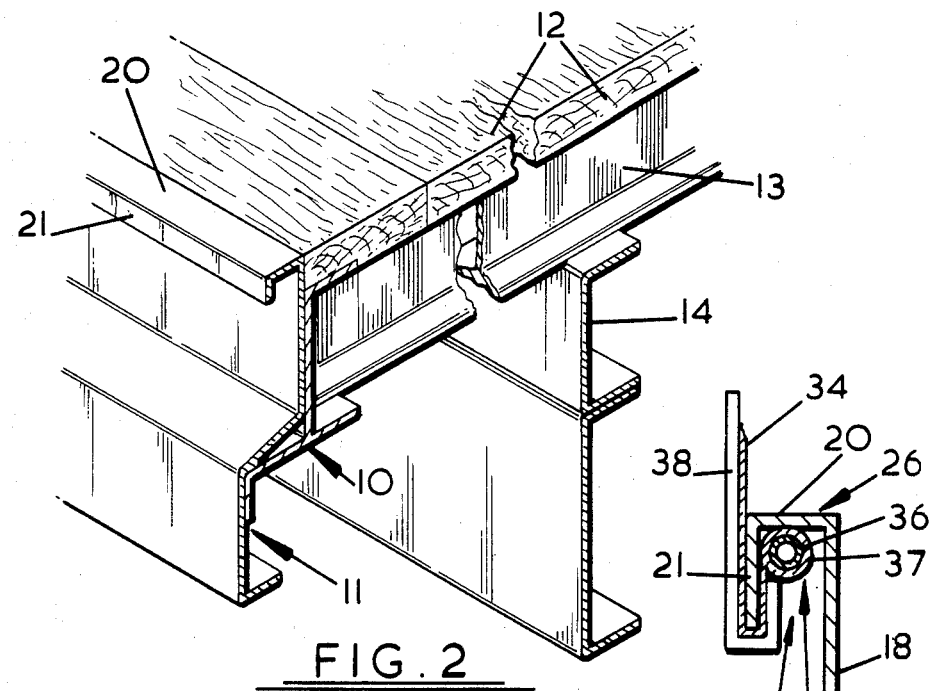
FIG. 2
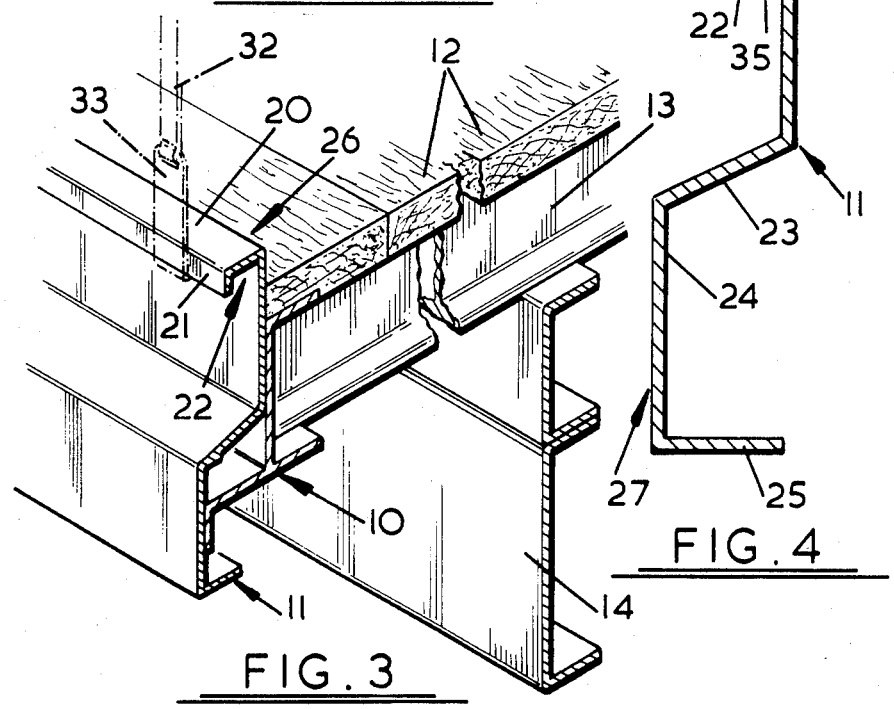
FIG. 3
FIG. 4

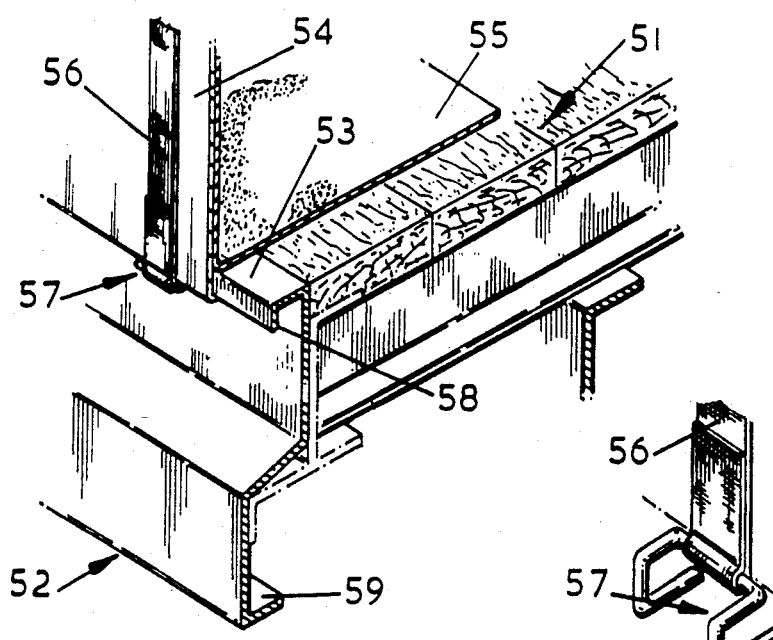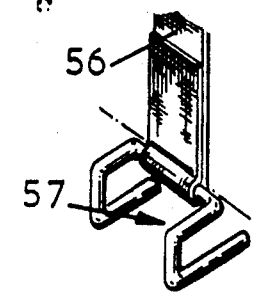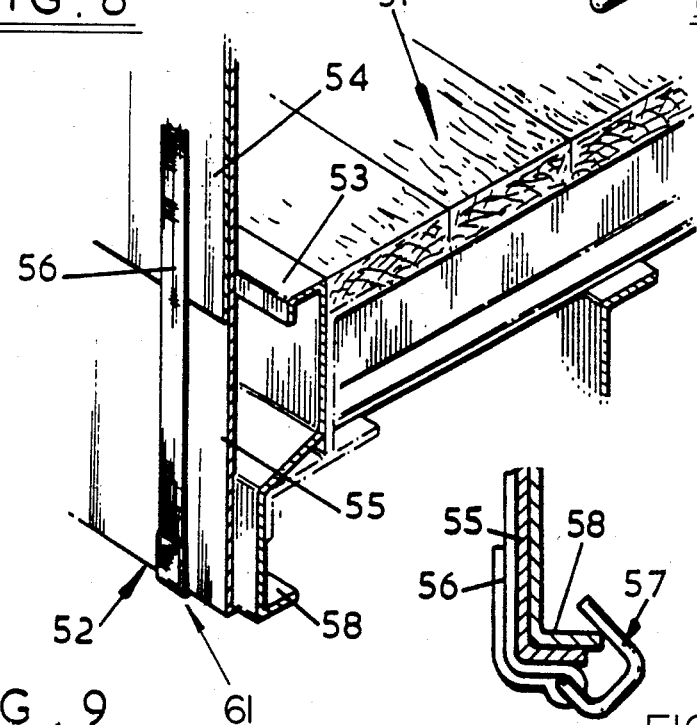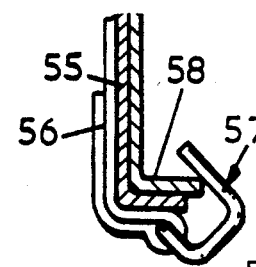

VAN BODIES

This invention relates to van bodies and in particular to curtainsided van bodies.

By the term "van body" as used herein and the claims is meant any body comprising a floor for supporting cargo with a roof supported above the floor and which is, or is intended to be, mounted on wheels to provide the trailer portion of an articulated van body, the body of a non-articulated road vehicle, a railway freight wagon or a cargo container.

An example of such a van body is disclosed in United Kingdom Patent Specifications Nos. B1 262 879 and B1 262 880 and corresponding U.S. Pat. No. 3,709,552.

In these patent specifications there is disclosed a curtainsided van body open at opposed lateral sides for cargo loading and unloading, which sides are closed by curtains restrained at one end of each side and movable across the open side to close same and for securement and horizontal tensioning at the other end of each side.

In such curtainsided van body the curtain, when in the closed position across an open side of the van body, is generally constrained or tensioned in the vertical plane by straps incorporating tensioning buckles and terminating at their lower ends in hooks engageable with a rave of the van body.

It is an object of the present invention to provide a van body having a rave which is more versatile than existing raves.

According to the present invention there is provided a van body comprising a floor and along a side thereof a rave having a top sill disposed either level with the floor or above the floor.

Also according to the present invention there is provided a van body comprising a floor and along a side thereof a rave which is height adjustable relative to the floor to provide a sill level with the floor or above the floor.

Also according to the present invention there is provided a curtainsided van body comprising at least one open vertical side closable by a curtain incorporating straps or similar for constraining the curtain in a vertical plane, the straps or similar having at or adjacent their lower ends rave-engaging elements, a floor for supporting cargo, and a rave along said at least one open vertical side and engagable by said elements to constrain the curtain vertically, the rave being height adjustable relative to the floor to provide a sill level with the floor or above the floor.

With this arrangement, therefore, the sill can be located at floor level if the cargo extends to the floor edge or above floor level to provide a bottom restraint against movement of cargo if the latter does not extend to the floor edge.

Preferably, the rave has a lower portion which extends further outboard from the floor more than the upper portion to provide a rubbing rail.

Preferably, the rave comprises an inner rave member secured to the van body floor and an outer rave member height adjustable relative to the inner rave member and providing the sill and rubbing rail.

Preferably, the outer rave member comprises a top, downwardly open hook-like configuration adapted to be engaged by a bottom hook of a curtain-restraining or tensioning strap.

Preferably, the curtain has an internal extension flap adapted to lie on and partially across the floor if the van body is being used to transport a bulk cargo, for example grain, the strap hooks engaging in the downwardly-open hook-like configuration.

The internal extension flap may be disposed downwardly to cover the face of the rave, the strap hooks engaging a flange at the rear of the rubbing rail.

In either of the above instances the sill may be level with the floor or above the floor.

If the rave is fitted to a curtainsided van body having insulated curtains as is disclosed in United Kingdom Patent Application No. 82 15736 (Publication No. 2 106 166) then it is preferred that the insulated curtain with a reinforced bottom edge be folded into the hook-like formation of the outer rave member and secured in this position by the strap hooks.

This provides an excellent seal at the floor of the van body.

An embodiment of the present invention will not be described, by way of example, with reference to the accompanying drawings, in which:

FIG. 2 is a perspective view of a van body floor with the rave sill in lowered position;

FIG. 3 is a perspective view corresponding to FIG. 2 with the rave sill in raised position;

FIG. 4 is a sectional view showing the rave used in a curtainsided van body incorporating an insulated curtain.

FIGS. 8 and 9 are fragmentary sectional perspective views of a particular form of curtain construction associated with the rave/floor construction of the present invention;

FIG. 8A is a perspective view of a bottom hook of FIG. 8;

FIG. 9A is a cross-sectional side view of the vertical strap and hook combination at 61 in FIG. 9.

Figure 5:
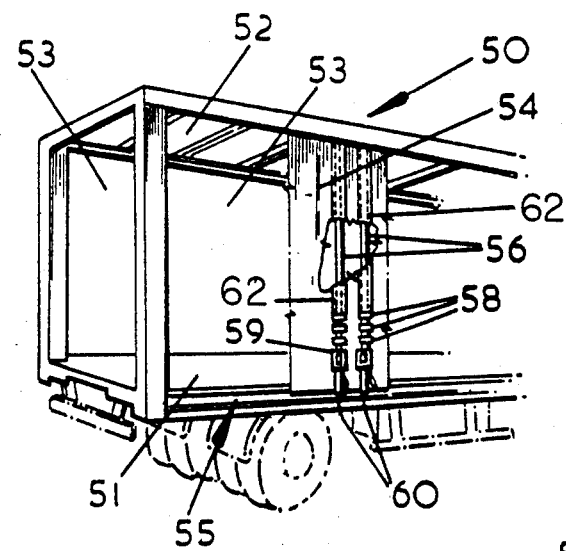
FIG. 5 is a diagrammatic fragmentary perspective view of a curtainsided van body incorporating the present invention.
Figure 5A:
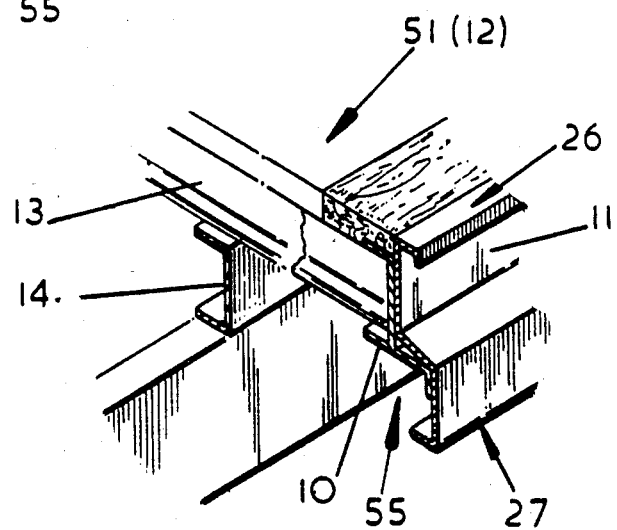
FIG. 5A is a perspective view, partly in section, showing the rave at 55 of FIG. 5.

Referring firstly to FIG. 5, the van body 50 is the body of a non-articulated vehicle and comprises a cargo supporting floor 51 and a roof 52 defining between them two opposed open lateral sides 53 closable by curtains 54. Along each side of the floor 51 is a rave construction generally indicated at 55.

The van body 50, in this example is as disclosed in the aforesaid British and U.S. patent specifications, the disclosure of which is included herein by reference.

The curtain 54 incorporates vertical straps 56, each running through a sleeve 62 in the curtain 54 and being threaded through eyelets 58 and a tensioning buckle 59 and terminating in a hook 60 for engaging the rave construction 55.

Figure 1:
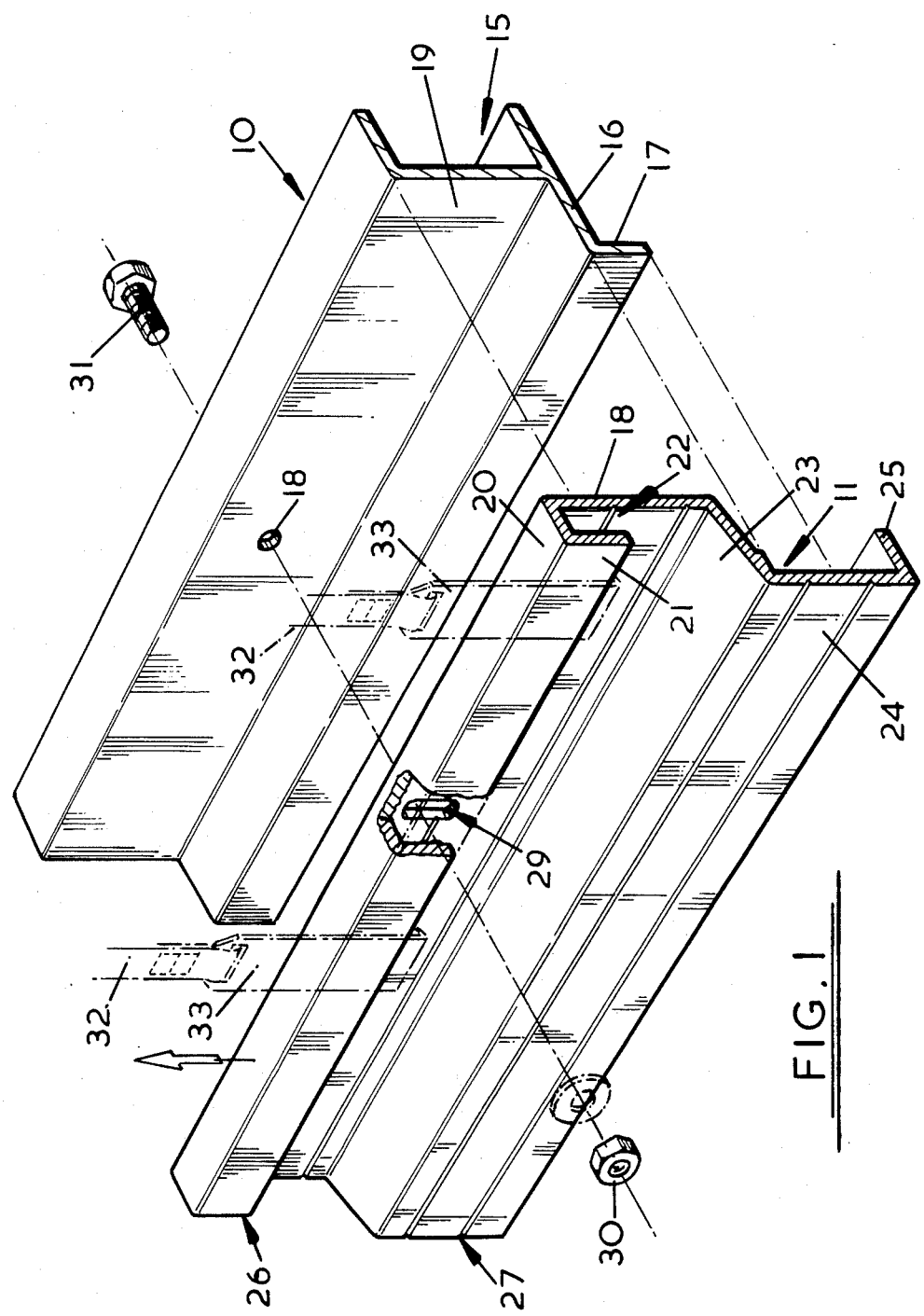
FIG. 1 is an exploded perspective view of a rave according to the present invention.

Referring now to FIGS. 1 to 3, the rave construction is constituted by two aluminium extrusions 10 and 11.

The inner rave extrusion 10 is secured to a hardwood floor 12 supported by transverse aluminium floor bearers 13 mounted on the chassis 14 of the road vehicle incorporating the van body 50 (see FIGS. 2 and 3).

The inner rave extrusion 10 comprises a channel formation 15 into which the bearers 13 engage with the hardwood floor 12 overlying the channel formation.

The bottom limb of the channel formation 15 extends outwardly of the hardwood floor 10 and bearers 13 as indicated at 16 and then downwardly as indicated at 17 to provide a vertical face.

The outer rave extrusion 11 has a vertical section 18 for abutment with the vertical section 19 of channel formation 15 of inner rave extrusion 10.

The top of vertical section 18 extends outwardly and then downwardly to provide a horizontal face 20 and a vertical face 21 parallel with the vertical section 18 to define an open-bottomed hook-like formation 22.

The bottom edge of the vertical section 18 of the outer rave extrusion 11 extends outwardly and downwardly as indicated at 23 beyond the face 21 and then downwardly vertically as indicated at 24 and finally horizontally inwardly as indicated at 25.

The upper part of vertical section 18 and horizontal and vertical faces define a sill 26.

The extensions 23 to 25 constitute a rubbing rail 27.

The inner rave extrusion 10 is, as aforesaid, secured to and forms part of the van body floor 12.

It is provided along its length with bolt holes 28.

The outer rave extrusion 11 is provided along its length with vertical slots 29 corresponding to the number of bolt holes 28.

The outer rave extrusion 11 can therefore be secured to the inner rave extrusion 10 by nuts and bolts 30, 31 and is height adjustable relative thereto to provide (see FIG. 2) the sill 26 flush with the hardwood floor 12 (cargo extending to edge of floor), or the sill 26 extending above the hardwood floor 12 (bottom cargo restraint).

In FIGS. 1 and 3, a curtain-restraining or tensioning strap is indicated at 32 with a hook 33 engaging the hook-like formation 22 of the outer rave extrusion 11. Such engagement can be effected irrespective of the sill height merely by adjusting the length of the strap 32.

Referring now to FIG. 4 which shows only the outer rave extrusion 11 there is shown an insulated curtain 34 as disclosed in the aforesaid published United Kingdom Patent Application which curtain 34 has a reinforced bottom edge 35, say a rope or cord 36 within a hem 37. A strap hook is indicated at 38.

It can be seen from FIG. 4 that the curtain 34 extends up into the hook-like formation 22 and that the curtain 34 is clamped twice between the parallel surfaces of the hook 38 and the vertical surface 21 of the rave extrusion 11 and also the reinforced edge 35 is clamped between the hook end and the horizontal face 20 of the extrusion 11.

This arrangement thus provides at floor level an excellent seal for the insulated curtain of the curtainsided van body.

Figure 6:
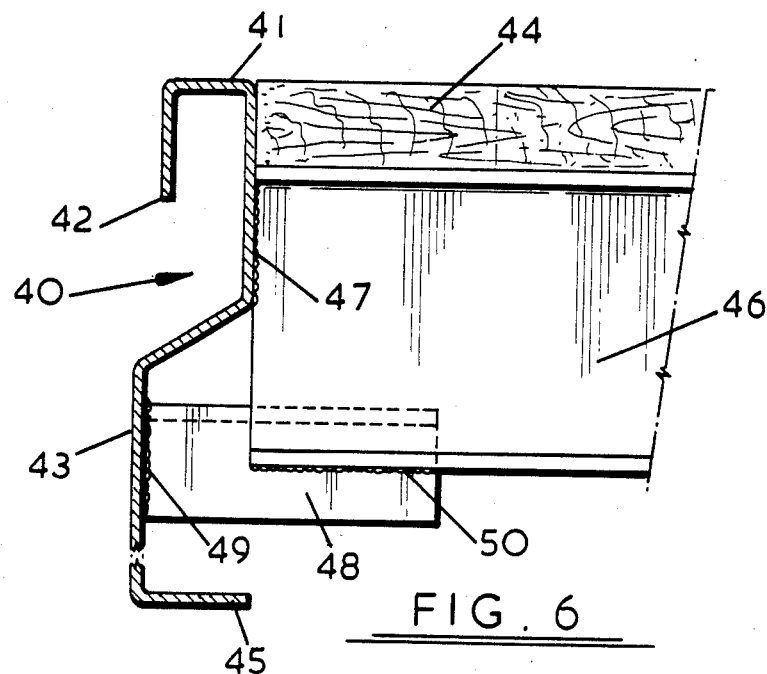
FIGS. 6 and 7 are fragmentary transverse sectional views showing alternative floor/rave constructions.
Figure 7:
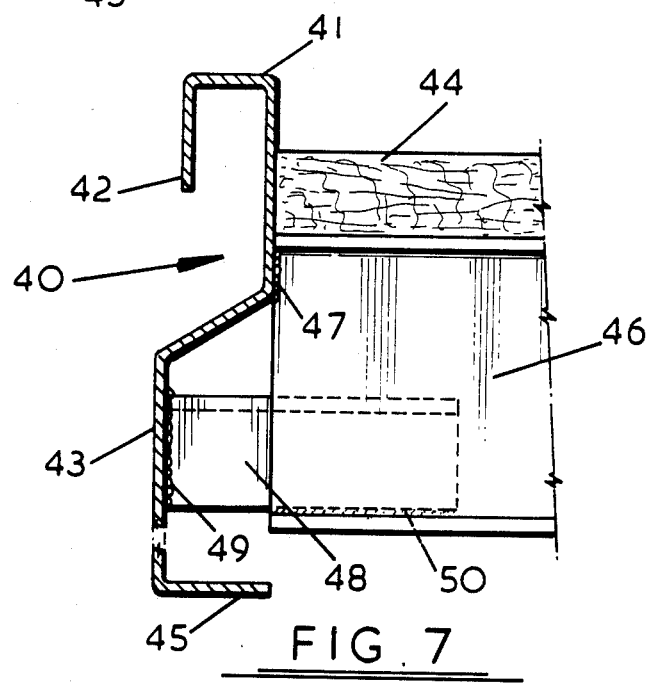

Referring to FIGS. 6 and 7 there is shown a rave 40 formed, for example, of steel.

The rave 40 has a top sill 41 with a downwardly-open strap hook formation 42 and a bottom rubbing rail 43 disposed further outboard from the van body floor 44 than the top still 41. The rubbing rail 43 has an inwardly-extending bottom flange 45 on which the strap hook can alternatively be engaged.

The floor 44 is supported by floor bearers 46 to which the rave is welded as indicated at 47.

The rubbing rail 43 is supported and rigidified by a support bar 48 welded, as indicated at 49 to the rear face of the rubbing rail 43 above the flange 45 and to the flow bearer 46 as indicated at 50.

Referring now to FIGS. 8 and 9, the van body floor is generally indicated at 51 and the rave at 52.

The rave 52 may be in accordance with any of the abovedescribed configurations and, while the top sill 53 is shown level with the floor 51, it may equally well be disposed above the floor 51.

The curtain 54, in this instance, has an internal flap 55 which, when the van body is being used to transport bulk products, say for example grain, to a brewery, lies along the floor 51, the weight of the grain sealing the flap 55 to the floor 51 and inner face of the curtain 54. Thus the grain is safely contained with the curtainsided van body.

The vertical tensioning curtain straps are indicated at 56 and the bottom hooks at 57 which, in this instance, engage the downwardly open formation 58.

In this instance the bulk cargo will be unloaded through the rear and/or a discharge outlet at the rear of the floor of the van body.

When the aforesaid curtainsided van body is, for example, returning from the brewery loaded with beer kegs and palletised crates of beer bottles for instance, the extension flap 55 (see FIG. 9) covers the face of the rave 52 and the straps 56 are extended to permit the hooks 57 to engage the rear flange 59 of the rubbing rail. Thus the flap 55 is clear of the load thus ensuring that there is no impediment (load lying on the flap) to the curtain being drawn back to one end of the van body to unload the cargo.

It will be manifest that a rave according to any of the aforesaid constructions is secured alongside each open side of a curtainsided van body.

It will also be manifest that the floor is supported on a number of transverse longitudinally-spaced floor bearers.

What is claimed is:

1. A curtainsided van body comprising:
   (a) a floor,
   (b) a roof supported above the floor and defining with a latter at least one open side,
   (c) a curtain suspended from the roof and movable across the open side to expose or conceal the latter,
   (d) tensionable straps vertically associated with the curtain to constrain the curtain in the vertical plane when the curtain is drawn across the open side to conceal same, each tensionable strap having a lower end,
   (e) a rave-engaging element at the lower end of each tensionable strap, and
   (f) a rave extending along the floor at said open side for engagement by the rave-engaging elements when the curtain is drawn across the open side to conceal same
   (g) the rave including
      (1) an upper open-bottomed hook-like formation extending outboard of the floor to define a top sill and engageable by the rave-engaging elements on the tensionable straps, and
      (2) a rubbing rail formation unitary with and spaced downwardly from the upper open-bottomed hook-like formation and extending outboard of the latter, the rubbing rail formation including a bottom flange,
      (3) the bottom flange of the rubbing rail formation extending inwardly in the direction of the floor to provide an alternative formation for engagement by the rave-engaging elements.

2. A curtainsided van body as claimed in claim 1 comprising mounting means, including transverse floor bearers, for mounting the floor on a vehicle chassis, the floor having an upper surface, and means connecting the rave to the floor bearers with the top sill level with the upper surface of the floor.

3. A curtainsided van body as claimed in claim 2, in which the rave is of steel, the rubbing rail formation including an inboard face, and including a support bar welded to the inboard face of the rubbing rail formation and to each floor bearer.

4. A curtainsided van body as claimed in claim 1, comprising mounting means, including transverse floor bearers, for mounting the floor on a vehicle chassis, the floor having an upper surface, and means connecting the rave to the floor bearers with the top sill extending above the upper surface of the floor.

5. A curtainsided van body as claimed in claim 4, in which the rave is of steel, the rubbing rail formation including an inboard face, and including a support bar welded to the inboard face of the rubbing rail formation and to each floor bearer.

6. A curtainsided van body as claimed in claim 1, comprising mounting means, including transverse floor bearers, for mounting the floor on a vehicle chassis, and the rave comprising an inner rave member connected to the transverse floor bearers, and an outer rave member defining the top sill and hook-like formation, the rubbing rail formation and the inboard bottom flange of the latter, the floor having an upper surface, the outer rave member being vertically adjustable relative to the inner rave member to dispose the top sill in a selected one of two positions, namely level with the upper surface of the floor and above the upper surface of the floor, and means for securing the inner and outer rave members in the selected position of the latter.

7. A curtainsided van body as claimed in claim 1, and further comprising an internal extension flap, the curtain having an inside and the internal extension flap being secured to the inside of the curtain along the length thereof.

8. A curtainsided van body as claimed in claim 7 for transporting bulk cargo, and in which the curtain internal extension flap is adapted to lie on and extend partially across the floor when the curtain is drawn across the open side to conceal same, the tensionable straps being of a length to cause the rave-engaging elements to engage the top downwardly-open hook-like configuration of the rave.

9. A curtainsided van body as claimed in claim 7, in which the curtain internal extension flap is adapted to be disposed downwardly to cover the rave, when the curtain is drawn across the open side to conceal same, the tensionable straps being of a length to cause the rave-engaging elements to engage the bottom inboard flange of the rubbing rail.

* * * * *